United States Patent [19]
Buck

[11] 3,869,943
[45] Mar. 11, 1975

[54] SELF-EJECTING CHUCK KEY
[75] Inventor: James R. Buck, Ross Twp., Mich.
[73] Assignee: Buck Tool Company, Kalamazoo, Mich.
[22] Filed: July 19, 1973
[21] Appl. No.: 380,669

[52] U.S. Cl. .................................. 81/90 A, 279/1 K
[51] Int. Cl. ............................................ B25b 13/02
[58] Field of Search ................ 279/1 K; 81/71, 90 A

[56] References Cited
UNITED STATES PATENTS
2,598,119    5/1952    Goff ........................................ 81/71
FOREIGN PATENTS OR APPLICATIONS
1,267,231    6/1961    France ..................................... 81/71

Primary Examiner—Al Lawrence Smith
Assistant Examiner—James G. Smith
Attorney, Agent, or Firm—Woodhams, Blanchard and Flynn

[57] ABSTRACT

A self-ejecting key for a machine tool chuck. For cooperation with a rotatable machine tool chuck, said chuck having a noncircular opening in a side thereof for the reception of a mating noncircular key for the opening and closing of said chuck, there is provided an appropriate key having a generally cylindrical portion terminating in a suitable noncircular portion for reception into said chuck opening. A coil spring is sleeved over the noncircular portion and anchored suitably in the cylindrical portion, the free circular end thereof terminating adjacent the free end of the noncircular portion of the key. Thus, when the key is inserted into the chuck opening the spring will compress and the key can function in a normal manner. When the operator releases the key the spring will automatically eject the key from the opening whereby to insure that the key will not inadvertently be left in the opening.

1 Claim, 4 Drawing Figures

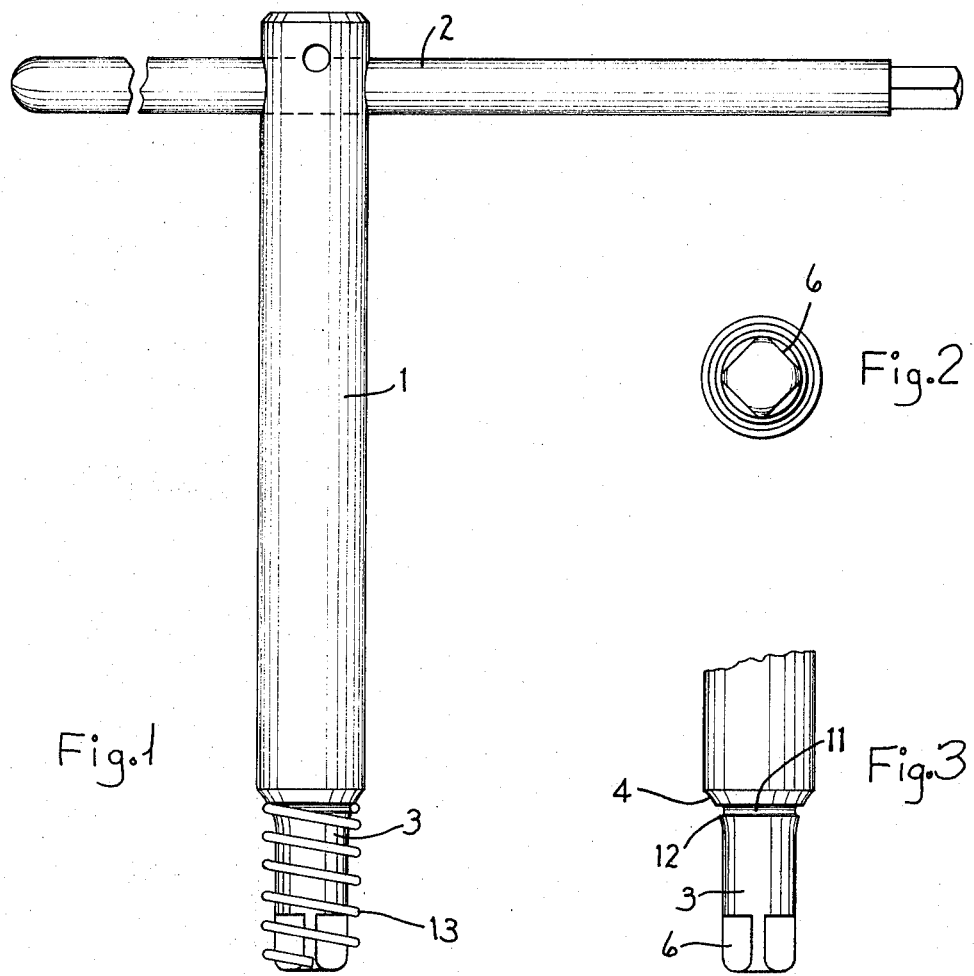
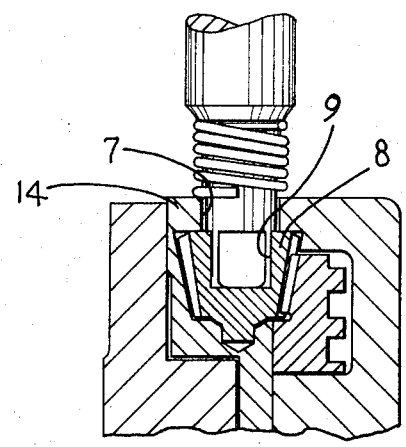

SELF-EJECTING CHUCK KEY

FIELD OF THE INVENTION

This invention relates to wrenches or keys for tightening machine tool chucks and particularly to a type of such wrench or key which is self-expelling from its operative position whereby to render it impossible for same to be left in position when the machine is started.

BACKGROUND OF THE INVENTION

In the provision of chucks for various types of machine tools, it has long been common to insert a wrench or key (hereinafter referred to only as a key) into some type of driving mechanism, such as a pinion, by which the appropriate parts of the chuck are operated for opening or closing of same. The opening receiving such key is necessarily on a rotating portion of the chuck. Hence, if the key is inadvertently left in position within the chuck when the machine is started, it can be thrown out from such opening with considerable force which presents obvious danger of injury to operating personnel.

It has already been recognized that this problem can be cured by some type of self-expelling key, namely a key which will expel itself from the chuck immediately upon being released by the operator, such as, for example, the type of chuck key shown in the patents to Des Jardins U.S. Pat. No. 3,673,895 or to Garton U.S. Pat. No. 2,690,690. However, chuck keys made according to the Garton patent and other generally similar arrangements are not only expensive to make but they permit dirt and coolant to enter into the sleeve and spring mechanism causing it to bind and thereby incurring the risk that the ejecting mechanism becomes inoperative. The chuck key shown in the Des Jardins patent is designed for a specialized use and is not adaptable to the more general use contemplated for the subject matter of the present invention.

Accordingly, the objects of the invention include:

1. To provide a self-ejecting chuck key adaptable for use with a wide variety of chucks having key openings in the rotating portion thereof.

2. To provide a chuck key, as aforesaid, which is of sufficiently open construction as to minimize the likelihood of its operation being hindered by accumulation of dirt, metal particles, coolant or other contaminating materials.

3. To provide a chuck key, as aforesaid, whose operating parts are visible at all times to the operator and hence if same do become excessively filled with dirt or other materials such condition will be at once apparent to the operator as well as to supervisory personnel.

4. To provide a chuck key, as aforesaid, which will be extremely inexpensive to manufacture and which will require virtually no maintenance.

Other objects and purposes of the invention will be apparent to persons acquainted with devices of this general type upon reading the following disclosure and inspection of the accompanying drawings.

In the drawings:

FIG. 1 is a side elevation view of a chuck key embodying the invention.

FIG. 2 is an end view of said wrench.

FIG. 3 is a fragmentary view of the wrench with the spring removed.

FIG. 4 is a partially phantom view showing the wrench in operating position.

SUMMARY OF THE INVENTION

In an otherwise standard chuck key having a noncircular end associated with a circular shank, there is provided suitable anchor means, preferably in the zone between the noncircular portion and the circular portion for the reception and anchoring of one end of a coil spring. The spring encircles the wrench from the anchor means to a point close to its end and by being circular where the key is noncircular it projects radially from the key sufficiently to insure its bearing against the side of the chuck. Thus, as the key is inserted, the spring is compressed and as soon as the operator releases his grip on the wrench the spring will expel it from the chuck opening.

DETAILED DESCRIPTION

Turning now to the drawings, there is shown a standard wrench having a shank 1 normally cylindrical together with a handle 2 of any desired type. The end of the shank 1 is of reduced diameter in the portion 3 thereof and parts 1 and 3 are connected by a tapering zone 4. The nose 3 of the key terminates with a series of flat areas 6, same being four in number in this embodiment.

In the chuck there is provided an opening 7 which leads to an element, here indicated schematically as a gear 8, which is caused to rotate in one direction or the other for opening or closing of the chuck jaws. The nose 3 enters through the opening 7 and the portion carrying the flats 6 enters into a suitably mating noncircular opening 9 in the member 8.

All of this is conventional and forms no part of the invention.

Turning now to the means comprising the self-expelling feature of the chuck key of the invention, there is first provided an anchor means for one end of a coil spring, preferably in the zone 4 located between the shank 1 and the nose 3. Said anchor means may take any of several forms, as a groove, slot, drilled hole or other, but is here shown as a groove 11. By cutting said groove 11 at a suitable point between the diameter of the shank 1 and the diameter of the nose 3 there is provided a ridge 12 between said groove and the nose 3 for holding the spring in place.

A coil spring 13 is sleeved onto the nose 3 and one coil thereof is received within the groove 11. The other end of the spring terminates adjacent the end of the portion carrying the flats 6, preferably slightly short thereof to facilitate the entry of said nose 3 into the opening 7.

Further, by cutting the groove on the tapered portion 4, the bottom of the groove 11 may be placed at a diameter preferably slightly greater than that of the nose 3. Hence a standard coil spring may be used with its end coil snapping tightly into the groove 11 while the remainder slides easily on the nose 3. Alternatively, the groove may be cut into the nose 3 but in such case a spring will be needed whose end coil is of a lesser diameter than the remainder thereof so as to snap into such groove, while permitting the major part of the spring to slide easily on the nose 3.

In operation, the nose 3 is inserted into the opening and pushed thereinto until the portion carrying the flats 6 enters into and engages the sides of the opening 9. This enables the chuck key to operate the chuck in a normal manner.

As the key so enters into the opening 7, the spring 13 engages the side walls 14 of the chuck and is compressed. So long as the operator holds the key in the hole 7, the chuck may be tightened or loosened as desired. However, as soon as the operator lets go of the key, same will be expelled from said opening by the spring. It thus becomes impossible for the key to be left in the opening 7 after the operator lets go of same other than by his deliberately removing the spring 13. Such removal will be difficult because of one coil of the spring being formed into the groove 11. Further, if such spring should be removed, the absence thereof will be obvious to supervisory personnel and appropriate action with respect thereto can be promptly taken.

The open nature of the spring 13 will minimize the accumulation therein of dirt, metal particles, cooling fluid or other foreign materials but if same do accumulate they will be readily apparent to the operator and may be easily removed.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. A self-ejecting chuck key adapted for introduction into a mating opening within the operating mechanism of a chuck, said key comprising:
   a substantially cylindrical shank portion adapted to have a transversely extending handle fixedly or removably connected to one end thereof;
   a cylindrical nose portion projecting outwardly from and fixedly connected to the other end of said shank portion, said nose portion having a diameter which is substantially smaller than the diameter of said shank portion;
   said nose portion having a plurality of flats formed thereon adjacent the free end thereof, said flats resulting in said nose portion having a noncircular part adjacent the free end thereof which is adapted to be inserted into the mating opening within the operating mechanism of a chuck;
   a tapering and generally conical connecting portion fixedly connecting said shank portion and said nose portion, said connecting portion tapering outwardly in a diverging manner as it extends in a direction from said nose portion toward said shank portion, said connecting portion having an annular groove formed therein and encircling same, said annular groove being spaced intermediate the ends of said connecting portion and resulting in the formation of an annular tapered projection positioned between said groove and said cylindrical nose portion, said annular projection having a diameter greater than the diameter of said cylindrical nose portion; and
   a standard coil spring having coils of uniform diameter encircling said nose portion over substantially the entire length thereof, one end of said coil spring being disposed at a point at least closely adjacent the free end of said nose portion, and the other end of said spring having an end coil thereof disposed within said groove for fixedly anchoring said other end of said spring.

* * * * *